M. FUSS.
SYSTEM FOR TREATING LIQUIDS WITH OZONE.
APPLICATION FILED APR. 9, 1909.
1,090,044.
Patented Mar. 10, 1914.
2 SHEETS—SHEET 1.
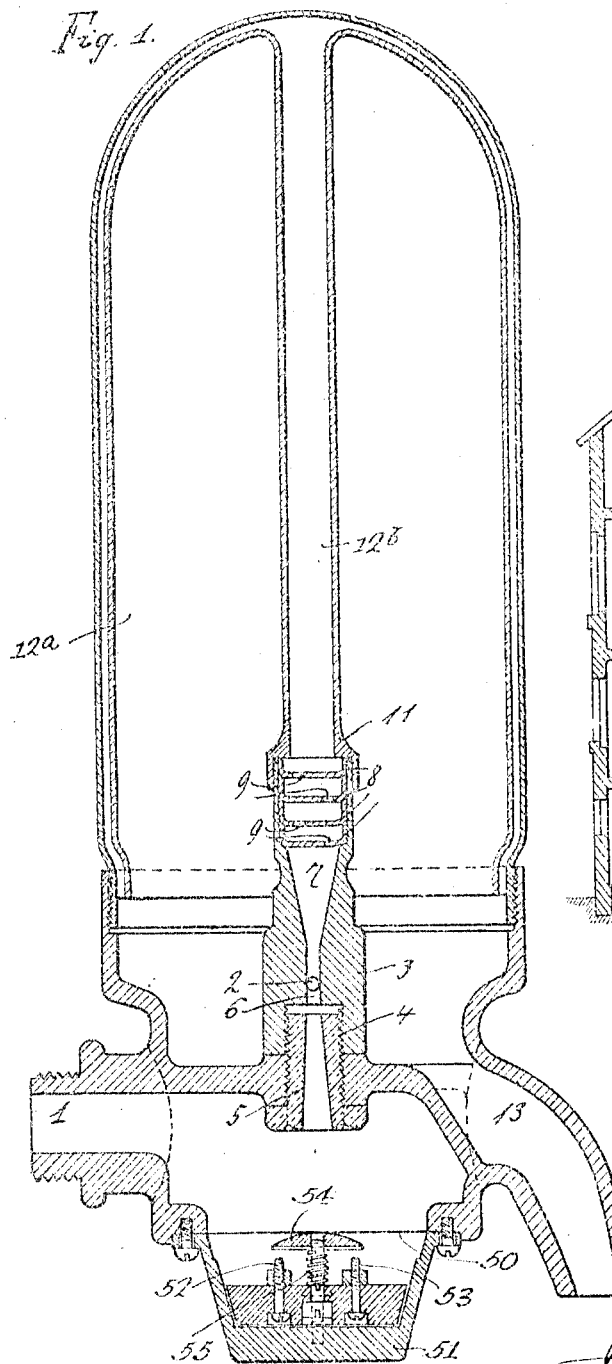
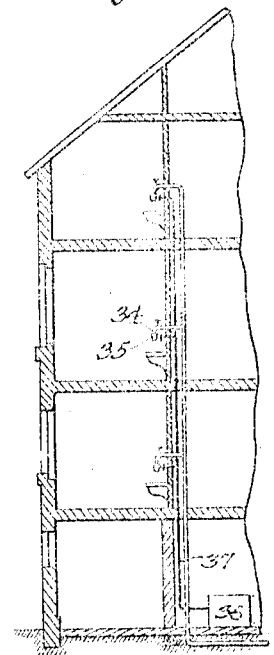

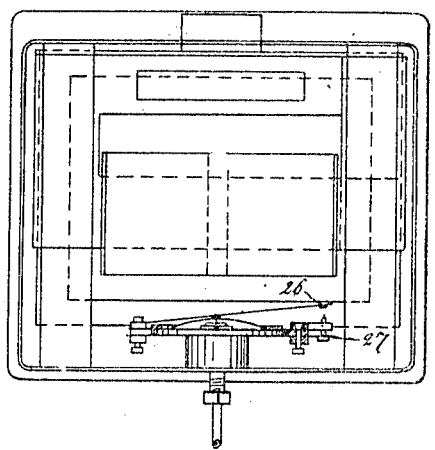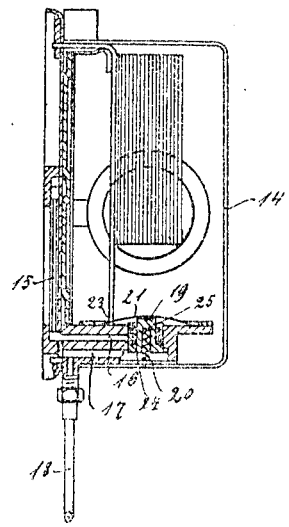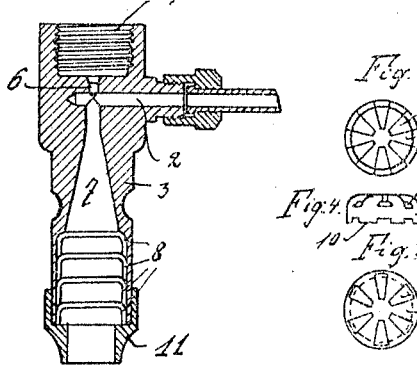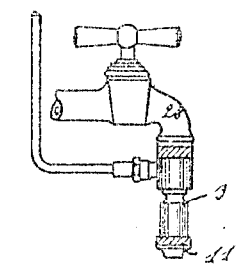

UNITED STATES PATENT OFFICE.

MAX FUSS, OF FRANKFORT-ON-THE-MAIN, GERMANY, ASSIGNOR, BY MESNE ASSIGNMENTS, TO GENERAL ELECTRIC COMPANY, A CORPORATION OF NEW YORK.

SYSTEM FOR TREATING LIQUIDS WITH OZONE.

1,090,044.  Specification of Letters Patent.  Patented Mar. 10, 1914.

Application filed April 9, 1909. Serial No. 489,001.

*To all whom it may concern:*

Be it known that I, MAX FUSS, a subject of the German Emperor, and a resident of Frankfort-on-the-Main, Germany, have invented certain new and useful Improvements in Systems for Treating Liquids with Ozone, of which the following is a specification.

This invention relates to improvements in systems for treating liquids with ozone for the purpose of oxidation and destruction of germs, and the object of the improvements is to provide a system by means of which such oxidation and destruction of germs takes place in a particularly effective way. As is well known, in systems of this class heretofore in use the effect of the ozone on the liquid was not sufficient for all purposes, because generally not all the germs were destroyed. The reason for the inefficiency of the systems appears to reside in the fact, that the liquid to be treated with ozone is generally brought in contact with the ozone when flowing in a single jet, so that not all of its particles come in thorough contact with the ozone.

This invention consists in providing a system, in which the liquid when treated with the ozone is so distributed as to present a large surface to the ozone, for which purpose it is discharged in thin jets or in the form of fine drops.

For the purpose of explaining the invention a system embodying the same has been shown in the accompanying drawings in which—

Figure 1, is a vertical section of an apparatus for treating liquid with ozone. Fig. 2, is a cross-section of a portion of Fig. 1 showing the apparatus for distributing the liquid in a fine jet and for mixing ozone therewith. Figs. 3 to 5 are respectively plans and a side view of one member of the distributing apparatus shown in Fig. 2, Fig. 6 is a side elevation, partly in section, of an apparatus embodying the invention and differing slightly from the form shown in Fig. 1: Fig. 7 is a front view of the ozonizer or apparatus for generating the ozone required in the process, and Fig. 8, is a side view of a system comprising a plurality of apparatus for mixing the ozone with liquid connected to a single source of ozone.

In the example of the system for treating a liquid with ozone illustrated in the drawings, the apparatus for mixing the ozone and liquid is provided with a tubular plug 1, whereby it can be connected to a suitable water supply, for example to a faucet of the water system of a building. From the said plug, the liquid passes through a suitable mixing apparatus, in which it is divided into fine streams. Into the said mixing apparatus the ozone is drawn through apertures 2 by the suction of the stream of liquid. As appears more clearly from Fig. 2, the mixing apparatus consists of a tube 3 having a transverse opening adapted to act as an injector or an ejector. The tube has screwthreaded engagement with a tubular plug 5 through which the liquid is admitted to the mixing apparatus. The liquid passes through the bore 6 of the tube 3 and draws in the ozone through the opening 2, and it flows with the same into the conical part 7 of the bore of the stud 3, the walls of which flare outwardly beyond the opening 2, so that the ozone is drawn in by the liquid, a partial vacuum being created within the suction duct 2.

Within the upper part of the chamber 7, in the form illustrated in Fig. 1, a plurality of superimposed perforated cup shaped disks 8 are located. The disks are provided with perforations 9, which, when the disks are assembled in the chamber 7, are off-set from each other, and the disks are held in place by teeth 10 provided on upwardly projecting flanges of said disks and engaging in notches 9 of the adjacent disks. The plates are secured in place by means of a cap nut 11.

As the liquid passes through the opening 9 in the disk 8, it is divided into a plurality of jets and is several times deflected from its course, so that it passes through the chamber filled with ozone in a state of fine distribution, whereby it is thoroughly mixed with the ozone.

In order to keep the liquid as long as possible in contact with the ozone, so that the ozone is entirely absorbed by the liquid, the liquid is not directly discharged into the atmosphere, after being mixed with the ozone in the chamber 7 in the manner described, but into a receptacle 12 located above the mixing apparatus. The said receptacle is so constructed, that the jet of liquid, by being thrown against the wall of the receptacle, is formed into a thin layer or into fine drops flowing down the wall of the receptacle and through an atmosphere of ozone before it is discharged through the spout 13.

As shown the receptacle 12 is provided with an inner shell 12ª, having a central tube 12ᵇ which communicates with the nozzle member 11. By this arrangement of parts the liquid is caused to travel in a thin sheet or series of thin drops through the relatively narrow space separating the outer wall of the casing 12 and the inner shell 12ª thereof.

The ozonizer or apparatus for generating the ozone which is preferably used in the improved system consists of plates forming electrodes and dielectric plates or disks interposed between said electrodes. The said apparatus is thrown into operation by means of a switch controlled by the pressure of the liquid to be subjected to the influence of the ozone. In the embodiment of the invention illustrated in Fig. 1 such switch is located below the mixing device hereinbefore described and comprises a diaphragm 50 clamped between the main casting or body of the device and a depending support 51. On said support are suitably mounted terminals 52, 53 of an electric circuit, and above these is arranged a circuit closing plate 54 which is maintained in contact with the diaphragm by action of a spring 55. When liquid is not passing through the supply duct 1 the spring 55 acts to lift the circuit closer 54 and diaphragm 50 into the position shown in the drawing, in which said plate is out of contact with the terminals 52, 53. The pressure of liquid passing through the device, however, will operate to depress the diaphragm and circuit closer to set in operation the apparatus for generating ozone which will be conducted to the mixing device through the duct 2, as previously described. In the preferred form of the system, however, the electrical apparatus of the ozonizer is entirely separated from the conduit for the liquid, so that the electrical apparatus can not be injured by the liquid, and the mixing apparatus can not be charged with electricity. For this purpose, the switch is located on the ozonizer or within the casing of the same, so that the electrical part of the system is entirely separated from the mixer. The connection between the switch and the liquid is made by a tube transmitting the vacuum created by the liquid to the switch controlling device and serving at the same time as a duct for the ozone from the ozonizer into the mixing apparatus. An example of this part of my invention is shown in Figs. 6 and 7. The ozonizer is inclosed within a casing 14. The duct for transmitting the ozone to the mixing apparatus consists of channels 15, 16, 17 and a tube 18. Between the channels 16 and 17 a valve 19 is located which is normally pressed by a spring 20 against its seat, while it bears with its upper surface against a diaphragm 21. The valve is made with ports 23 and 24 and with openings 25 located perpendicularly to the latter. On the upper surface of the diaphragm a spring arm is supported which at its free end holds a contact 26 above a contact 27. The duct 15, 16, 17, and 18 communicates with the ejector 3, 11 which in the example illustrated is located at the discharge side of the faucet 28.

In the embodiment of the invention illustrated in Fig. 6, the chamber 12 of the form shown in Fig. 1 is omitted, and the mixing tube opens downward, or in the direction represented in Fig. 2.

The operation of the apparatus is as follows: When the valve on the faucet 28 is opened, the jet of liquid passing through the ejector 3, 11 creates a partial vacuum within the suction ducts 18 and 17. Therefore the atmospheric pressure on the diaphragm 21 causes the valve 19 to be moved from its seat against the action of the spring 20, so that the port 23 is brought into communication with the duct 16. Thereby the sections 15 and 16 of the suction duct communicate with the sections 17 and 18, and the contacts 26 and 27 are closed, so that the apparatus for producing the ozone is thrown into operation. If now for any reason after opening the valve on the faucet 28 the pressure within the suction duct 15, 16, 17, and 18 be not decreased as before described but increased, and if part of the liquid be forced through said duct and toward the ozonizer, the valve 19 is pressed on its seat not only by the spring 10 but by the pressure of the liquid within the suction duct, so that the ozonizer is shut off from the liquid supply.

In the apparatus for producing ozone just described, in which plain disk electrodes and interposed dielectric plates are used, the discharge of the electricity takes place without interruptions and in the form of layers. In apparatus of this class it is difficult to hold the plates at the proper distances from one another, without unduly choking the passage of the air to be transformed into ozone, and to decrease the fields of the discharge. Therefore the metallic plates and the dielectric plates are held in their proper relation by means of small projections on the said plates.

By the construction of the switch and its controlling devices so far described and illustrated in Figs. 6 and 7 of the drawings the liquid is entirely separated from the ozonizer and its electrical apparatus. As appears from Fig. 8, the same ozonizer can be provided for a plurality of mixing devices. As shown in the said figure, each of the faucets 34 is provided with a mixing apparatus 35, communicating with the same ozonizer 36. If now one of the faucets is opened, the liquid discharged thereby draws in ozone from the said apparatus through the duct 37, and the apparatus is automatically thrown into action by the aforesaid switch. In order to avoid in this case the admission of air to the spouts from spouts which are not in operation, so that nothing but ozone is drawn in by the liquid, each spout is preferably provided with a back pressure valve.

In the example illustrated in the drawings, the transformer and the ozonizer are inclosed within the same casing.

Claims:

1. In a system for treating liquids with ozone, the combination with a duct for the liquid, means to add ozone to the liquid while passing through said duct, a plurality of cup shaped plates located within said duct so as to bar the free passage of the liquid and having apertures adapted to break the liquid up into fine streams.

2. In a system for treating liquids with ozone, the combination with a duct for the liquid, means to add ozone to the liquid while passing through said duct, a plurality of plates located within said duct so as to bar the free passage of the liquid and having apertures adapted to break the liquid up into fine streams, said plates being formed with upwardly extending flanges having teeth engaging in notches made in the surfaces of the adjacent plates.

3. In a system for treating liquids with ozone, the combination with the mixing chamber, of an electric ozonizer, means to throw said apparatus into operation, said means being located on the ozonizer and away from the mixing chamber, and a connection between said mixing chamber and ozonizer whereby said means for throwing the ozonizer into operation are controlled by the passage of the liquid through said mixing chamber.

4. In a system for treating liquids with ozone, the combination with a mixing chamber comprising a liquid supply, and means to draw in the ozone by suction, of an ozonizer, controlling means for the same, a suction duct connecting said ozonizer and said mixing chamber, means operated by the pressure within said suction duct to actuate said controlling means for the ozonizer.

5. In a system for treating liquids with ozone, the combination with a mixing chamber comprising a liquid supply, and means to draw in the ozone by suction, of an ozonizer, controlling means for the same, a suction duct connecting said ozonizer and said mixing chamber, means operated by the pressure within said suction duct to actuate said controlling means for the ozonizer, and a valve within said duct adapted to prevent the liquid from flowing from the mixing chamber to the ozonizer.

6. In a system for treating liquids with ozone, the combination with an ozonizer and a plurality of mixing apparatus for adding the ozone to the liquid, of connections between each of said mixing apparatus and the ozonizer, and automatic means controlled by each of said mixing apparatus to throw the ozonizer into operation.

In testimony whereof I have signed my name to this specification in the presence of two subscribing witnesses.

MAX FUSS.

Witnesses:
  JEAN GRUND,
  CARL GRUND.